United States Patent [19]

Parchmont

[11] 4,002,316
[45] Jan. 11, 1977

[54] TELESCOPIC SHOCK ABSORBER MOUNT FOR A HYDRAULIC CUSHIONING UNIT IN A RAILWAY CAR TRAILER HITCH

[75] Inventor: Harvey O. Parchmont, Stafford, Tex.

[73] Assignee: ACF Industries, Incorporated, New York, N.Y.

[22] Filed: May 6, 1975

[21] Appl. No.: 574,993

[52] U.S. Cl. .................. 248/119 S; 105/368 S; 248/500; 403/262

[51] Int. Cl.² .......................................... B60P 7/00

[58] Field of Search ............. 52/292, 298, 753 K, 52/755, 757; 248/119 S, 25, 226 R, 316 R, 400, 500–510; 269/43, 91; 285/137; 403/230, 262; 105/368 S

[56] References Cited

UNITED STATES PATENTS

| 230,083 | 7/1880 | Sylvester | 403/230 |
|---|---|---|---|
| 1,231,928 | 7/1917 | Miller et al. | 285/137 R X |
| 1,867,271 | 7/1932 | Larsen | 248/503 X |
| 2,864,892 | 12/1958 | Perkins | 248/226 R X |
| 2,917,267 | 12/1959 | Riddle | 248/507 |
| 2,965,886 | 12/1960 | Mitchell | 403/230 X |
| 3,490,723 | 1/1970 | Atkinson | 105/368 S X |
| 3,512,739 | 5/1970 | Powell et al. | 248/119 S |
| 3,851,849 | 12/1974 | Green | 403/230 X |
| 3,869,152 | 3/1975 | De Vincent et al. | 285/137 R |

FOREIGN PATENTS OR APPLICATIONS

| 526,387 | 6/1956 | Canada | 403/230 |

*Primary Examiner*—Lawrence J. Staab
*Attorney, Agent, or Firm*—Eugene N. Riddle

[57] ABSTRACT

A mount for securing a pair of telescopic shock absorbers to an end plate in a cushioning unit for a collapsible trailer hitch used for securing a semi-trailer to the deck of a railroad car. An assembly engages indentations in adjacent side portions of each of the shock absorbers at one end portion thereof to secure the shock absorber to an end plate on which the shock absorbers are mounted.

13 Claims, 8 Drawing Figures

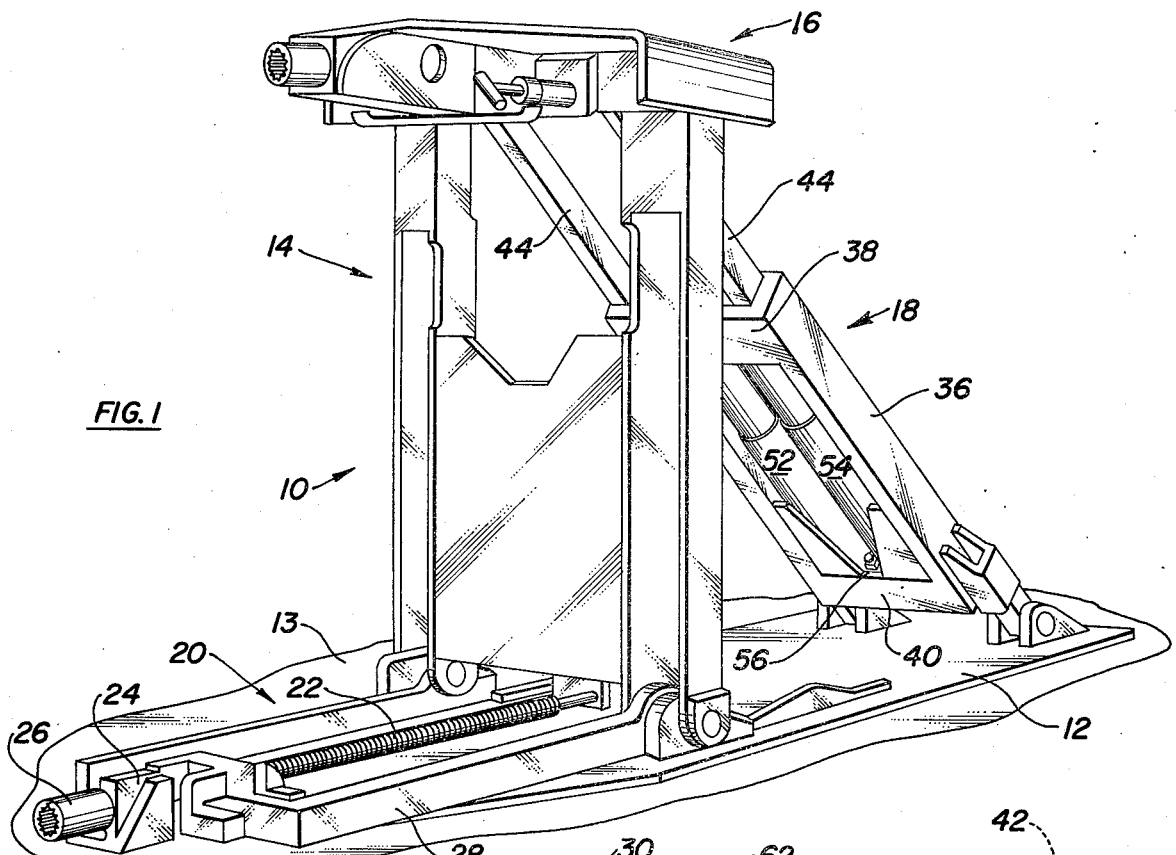
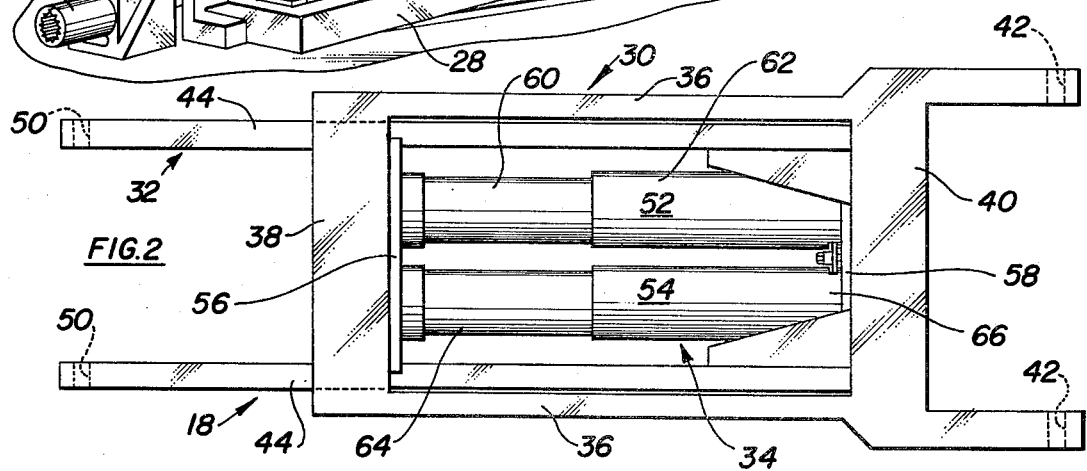
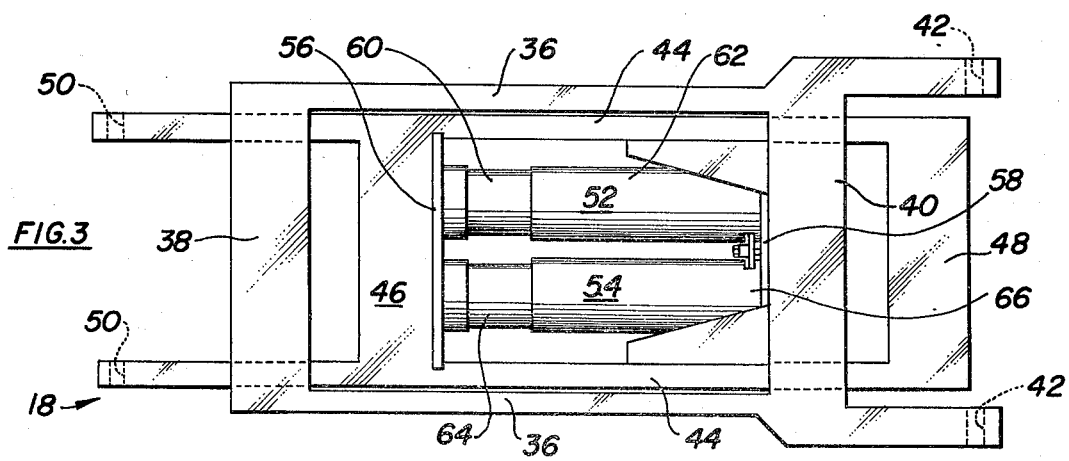

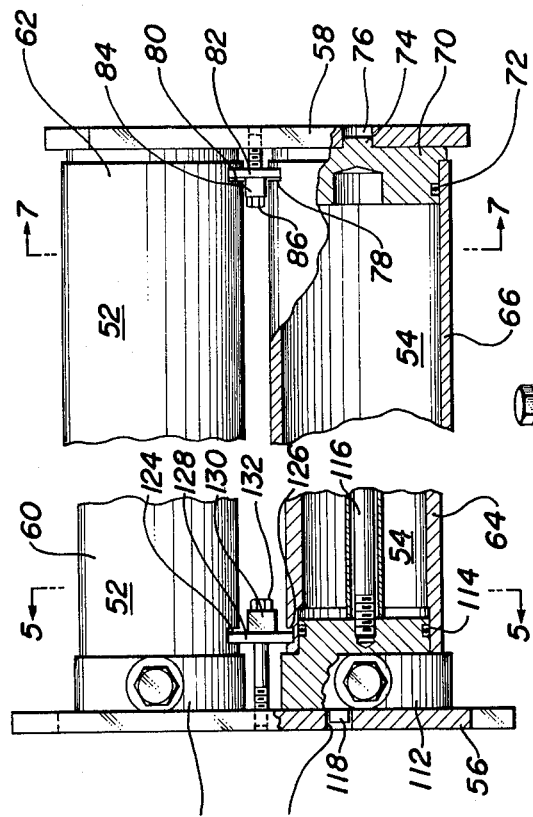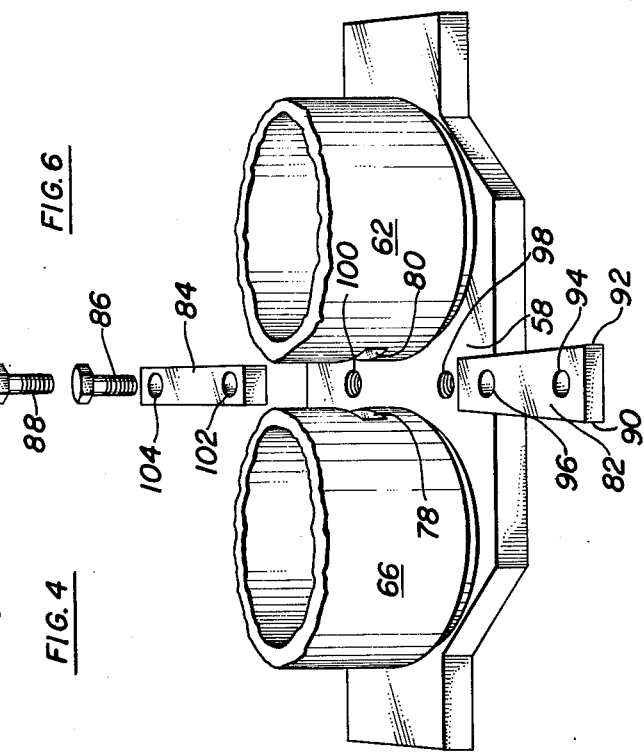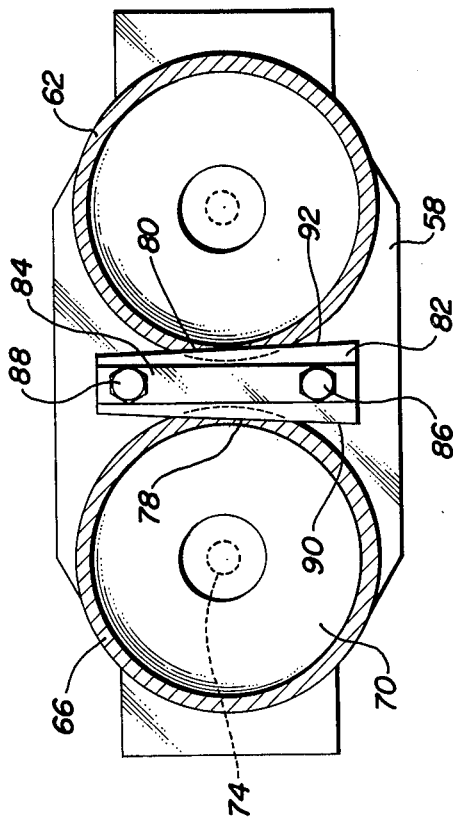

TELESCOPIC SHOCK ABSORBER MOUNT FOR A HYDRAULIC CUSHIONING UNIT IN A RAILWAY CAR TRAILER HITCH

BACKGROUND OF THE INVENTION

This invention is related to hydraulic cushioning devices for trailer hitches used on railroad cars and particularly to mounts for securing telescopic shock absorbers in hydraulic cushioning devices. In heretofore known hydraulic cushioning devices using telescopic shock absorbers the shock absorbers are mounted in a yoke like frame structure which has long bolts to mount an end plate on to one end of the shock absorbers. This is shown in detail in U.S. Pat. No. 3,512,739 dated May 19, 1970 wherein a pair of telescopic shock absorbers are mounted in a yoke like frame structure that forms one leg of a collapsible trailer hitch which is used for releasably securing a trailer to the deck of a railway car. Here a retainer is positioned on shock absorbers at one end of the outer cylindrical members of the shock absorbers and the retainer is bolted to an end plate at one end of the shock absorbers. In this cushioning unit the retainer for the outer cylinders of the shock absorbers is either a plate having bores therethrough to receive and pass the inner cylindrical members of the shock absorber, or the retainer comprises enlarged portions on the bolts which will engage the inner ends of the outer telescopic members. In either case the bolts must extend at least the full length of the outer cylindrical members and be rigidly secured to the end plate. By securing the shock absorbers in this manner very long bolts must be utilized which results in considerable expense for the bolts alone as well as requiring considerable time for a mechanic to assemble the cushioning unit. Additionally, the long bolts can be troublesome in the event one is twisted and broken during assembly or installation of the cushioning unit.

BRIEF DESCRIPTION OF THE INVENTION

This invention is directed to a mount for shock absorbers in a cushioning unit for a railway car fifth wheel hitch which has a plurality of telescopic shock absorbers mounted on an end plate. Each of the shock absorbers has at least two telescopic members. An indentation in the form of a notch is provided in each of the shock absorbers at a point spaced from one end of them. The notches are arranged in a facing relation. A means for positioning the shock absorbers has a male member in the form of a lug extending from one end of a shock absorber and a female member in the form of a recessed portion in the end plate. A means to secure the shock absorbers has a bar mounted between the shock absorbers with its opposed edges engaged in the notches. The bar is rigidly secured to the end plate so the bar in combination with the lugs and the recesses rigidly secure the shock absorbers to the end plate. This mounting structure can be used on one end or on both ends of a plurality of shock absorbers in a cushioning unit. This mounting provides a simple means to secure the shock absorbers to the end plate in a cushioning unit. This mounting construction can be used with either one or both ends of a plurality of shock absorbers for mounting them with one or two end plates.

One object of this invention is to provide a mounting structure for shock absorbers in a hydraulic cushioning unit overcoming the aforementioned disadvantages of the prior art devices.

Another object of this invention is to provide a simple mount structure for telescopic shock absorbers in a hydraulic cushioning unit of a collapsible trailer hitch for railroad cars where an end of the shock absorbers is positioned on an end plate by lugs on the shock absorbers and engaged in recesses in the end plates and where the shock absorbers have notches in facing portions of the shock absorbers to receive a bar that is rigidly secured to the end plate.

Various other objects, advantages, and features of the invention will become apparent to those skilled in the art from the following discussion, taken in conjunction with the accompanying drawings, in which:

DESCRIPTION OF THE DRAWINGS

FIG. 1 is a perspective view of a collapsible trailer hitch construction having shock absorbers in a diagonal leg thereof and shown in a raised position;

FIG. 2 is a plan view of the diagonal leg structure illustrating the shock absorbers and the structural elements of the diagonal leg in a neutral position;

FIG. 3 is a plan view of the diagonal leg structure illustrating the shock absorbers and the structural elements of the diagonal leg in a compressed condition;

FIG. 4 is a partially cutaway elevation view of the normally upper end portion of the cushioning unit employing the mounting structure of this invention;

FIG. 5 is a cross-sectional view of the cushioning unit taken on line 5—5 of FIG. 4;

FIG. 6 is a partially cutaway elevation view of the normally lower end of the cushioning unit employing the mounting structure of this invention;

FIG. 7 is a sectional view of the cushioning unit taken on line 7—7 of FIG. 6; and FIG. 8 is an exploded perspective view of the normally lower end portion of the cushioning unit with the bar member, its stiffener member, and the bolts therefor displaced from their normally mounted position.

The following is a discussion and description of the mounting structure of this invention, with such being made with reference to the drawings, whereupon the same reference numerals are used to indicate the same or similar parts and/or structure. It is to be understood that such discussion and description is not to unduly limit the scope of the invention.

DETAILED DESCRIPTION

Referring to the drawings, FIG. 1 illustrates a collapsible trailer hitch, indicated generally at 10, for supporting a fifth wheel coupler of a semi-trailer on a railway flat car. The collapsible hitch structure 10 includes a base plate 12 which is welded to or otherwise fixed on the deck 13 of a railway flat car, an upright leg assembly 14 pivotally mounted on base plate 12. A fifth wheel support structure 16 is pivotally mounted atop upright leg assembly 14. A diagonal brace or leg assembly 18 is pivotally connected to the fifth wheel support structure and to base plate 12. A hitch raising and lowering operator is provided on base plate 12 and operably connected with upright leg assembly 14. Fifth wheel hitch support assembly 16 is pivotally mounted so that it will move relative to base plate 12 when brace or diagonal leg assembly 18 is extending or retracting. This pivotal movement allows the fifth wheel support assembly 16 to maintain a substantially parallel relation to base plate 12 when in the raised position and to allow for forward and aft movement of a semi-trailer when coupled with the fifth wheel support assembly.

The fifth wheel support assembly 16 can be any one of a number of commercially available hitch structures to releasably secure the fifth wheel of a semi-trailer. Operator 20 is constructed with an operating screw 22 rotatably supported in a mount 24 and having a connector 26 on one end thereof. An operating frame 28 is mounted on screw 22 and pivotally connected with the lower end of upright leg assembly 14. Operator 20 is positioned as shown in FIG. 1 to support upright leg assembly in an upright position. Lowering of the hitch structure is accomplished by rotating screw 22 which moves operating frame 28 and lower portion of upright leg assembly 14 to the right as is shown in FIG. 1. Diagonal leg assembly 18 will remain in an essentially neutral position as the fifth wheel support is lowered.

With reference to FIGS. 2 and 3, the diagonal leg assembly 18 includes an outer frame structure, indicated generally at 30, which is slidably mounted with an inner frame structure, indicated generally at 32. The cushioning unit or assembly, indicated generally at 34, is mounted between inner frame 32 and outer frame 30. The frames 30 and 32 and the cushioning assembly are constructed such that extending motion of the frames or compressing motion of the frames will compress the cushioning unit 34. Outer frame 30 includes a pair of parallelly disposed outer rails 36 on opposite sides thereof with transverse brace plates 38 and 40 rigidly secured therebetween. At one end of outer rails 36 apertures 42 are provided for pivotally mounting that end portion of diagonal leg assembly 18. Inner frame 32 includes a pair of outer rails 44 on opposite sides thereof which are rigidly connected by transverse brace plates 46 and 48 as shown. Each frame 30 and 32 has brace plates rigidly secured to both sides of the rails. Only one side of frames 30 and 32 is shown in the drawings. For convenience in identification brace plates on opposite sides of frames bear the same numerals. Brace plates 48 are disposed at the normally lower end portion of inner frame 32 and the other brace plates 46 are disposed in a mid-portion of inner rails 44. The normally upper end portion of inner rails 44 is provided with pivot apertures 50 for pivotally mounting that end portion of inner frame assembly 32.

The cushioning unit 34 is comprised of a pair of gas-hydraulic shock absorbers, indicated generally at 52 and 54, which are disposed in a generally parallel relationship with the opposite ends thereof mounted on guide plates or end plates 56 and 58 on the upper and lower ends thereof respectively. Guide plate or end plate 56 has notches in its opposite end portions to engage inner rails 44 and its center portion is wider than the thickness of inner frame 32. In the neutral position of diagonal leg assembly 18 end plate 56 is supported by transverse brace plates 38 and 46 and end plate 58 is supported by transverse brace plates 40 and 48. End plate 56 is supported by transverse brace plates 46 of inner frame 32 when diagonal leg assembly 18 is in a compressed position as shown in FIG. 3. End plate 56 is supported between transverse brace plates 38 of outer frame assembly 30 when diagonal leg assembly 18 is in an extended position. End plate 58 has protrusions on its opposite ends to engage the inside of inner frame rails 44 and it is wider than the thickness of inner frame assembly 32 so the sides thereof extend over transverse brace plates 40. End plate 58 is supported by outer frame 30 and inner frame 32 when in a neutral position as shown in FIG. 2. End plate 58 is supported by transverse brace plates 40 when diagonal leg assembly 18 is compressed, and it is supported by transverse brace plates 48 when diagonal leg assembly 18 is extended.

Each of the shock absorbers 52 and 54 has an inner cylinder and an outer cylinder which are slidably mounted together. In shock absorber 52 inner cylinder is indicated at 60 and the outer cylinder is indicated at 62. In shock absorber 54 the inner cylinder is indicated at 64 and the outer cylinder at 66. Cushioning unit 34 is constructed so the inner cylinders 60 and 64 contain the air containing portion of the cushioning device and the outer cylinders 62 and 66 contain the hydraulic containing portion of the cushioning device.

FIGS. 4 and 6 illustrate in detail the mounting construction of the shock absorbers and the end plates. Shock absorber 54 and portions of the end plates are cut away for clarity in FIGS. 5 and 6 to illustrate the mounting structures. An end member 70 is mounted in the end of outer cylinder 66. An O-ring 72 is provided in a peripheral notch around end member 70 for sealing the end member and cylinder 66. End member 70 has a male member in the form of a lug 74 extending from the center portion of its exposed side. End plate 58 has a female member 76 in the form of an aperture therethrough to receive and mount lug 74. Outer cylinder 66 has an indentation in the form of a notch 78 in its side as shown. Notch 78 is spaced from the end of cylinder 66 and oriented perpendicularly relative to the elongated axis of cylinder 66. Notch 78 is perferably generally rectangular in cross section with the bottom thereof being on a cord of the cross-sectionally circular cylinder 66. The exposed surface of end member 70 is in proximity to the exposed end of cylinder 66 and it rests on end plate 58. Outer cylinder 62 also has an indentation in the form of a notch 80 therein formed similarly to notch 78. Outer cylinder 62 is preferably constructed the same as outer cylinder 66 and includes an end member with a lug mounted in an aperture in end plate 58 similar to the construction visible in FIG. 6.

A bar member 82 is mounted with its opposite edge portions engaged in notches 78 and 80. A stiffener member 84 is mounted on the side of bar 82 opposite to end plate 58 and it is secured to end plate by bolts 86 and 88 as shown in FIGS. 6 and 7. Bar member 82 is elongated and has its opposed sides 90 and 92 tapering one toward the other through its length. Bar member 82 has apertures 94 and 96 in its opposite end portions to receive bolts 86 and 88 respectively. End plate 58 has threaded apertures 98 and 100 therein to receive and threadedly mount bolts 86 and 88 for securing bar 82 and stiffener 84 to the end plate. Stiffener member 84 is provided with apertures 102 and 104 therethrough to receive bolts 86 and 88 respectively. Stiffener 84 provides stiffening for bar member 82 so that it can be securely tightened in its engagement with cylinders 62 and 66 by means of bolts 86 and 88 securing it to end plate 58. Stiffener 84 is provided to prevent warping, bending or significant deformation of bar 82. The lugs on the cylinders' end members in combination with bar 82 and its notched mounted relation with the cylinders provide for rigid mounting of shock absorbers 52 and 54 with end plate 58 in cushioning unit 18. The normally lower end of shock absorbers 52 and 54 can be secured to end plate 58 by the mounting structure as illustrated in FIG. 6 and as shown in the complete structure in FIGS. 2 and 3. The novel mounting structure of this invention provides a means to secure at least one end of a pair of shock absorbers to an end plate for mounting them in a brace or diagonal leg assembly 18 of a collapsible railway fifth wheel hitch. In use of the novel mounting structure of this invention it has been successfully used for mounting the normally lower end of the shock absorbers in a hydraulic cushioning unit for the described application and such has proven to be quite successful.

The normally upper end portion of the shock absorbers 52 and 54 can be mounted with the upper end plate 56 as shown in FIGS. 4 and 5. The normally upper end portion of shock absorbers 52 and 54 contains the air portion of the air-hydraulic cushioning apparatus. FIG. 4 shows the end portion of shock absorber 54 and end plate 56 partially cut away for clarity and to expose portions of the novel mounting structure of this invention. Shock absorber inner cylinders 60 and 64 are provided with end members 110 and 112 respectively which each have a portion thereof mounted inside of the respective cylinders. End cap member 112 is cut away in FIG. 4 for clarity. End member 112 has an O-ring 114 mounted in a peripheral notch in the portion of the end member which is positioned inside cylinder 64. An elongated member 116 threaded on the end is threadedly engaged with the inner side portion of end member 112. The elongated member 116 is connected to other apparatus, now shown, for effecting operation of the shock absorber. A male member in the form of a lug 118 extends from the center portion of the exposed end of end member 112 and it rests in a female member in the form of an indentation in end plate 56. Preferably the indentation is an aperture 120 through end plate 56. Each of the inner cylinders 60 and 64 has indentations in the form of notches 124 and 126 therein in a spaced relation in the side thereof inward of the end of each cylinder. A means to secure the shock absorbers has an elongated bar member 128 mounted with its opposed edge portions engaged in notches 124 and 126 as shown in FIG. 4. A bar stiffener member 130 is mounted on the side of bar 128 opposite to end plate 56. Bolts 132 and 134 are mounted through apertures in the opposite ends of bar 128 and stiffener 130 to secure these members to end plate 56 with bar 128 in its engaged position in notches 124 and 126. The opposed sides of bar 128 are tapered in an angular relation toward each other to wedge the bar into the notches between the cylinders as shown in FIG. 5. Notches 124 and 126 are preferably cross-sectionally rectangular and are substantially spaced from the ends of the respective cylinders as shown in FIG. 4. The notches are formed so the innermost edges thereof form a cord across the cross-sectionally round cylinders. Stiffener 130 provides bracing of bar 128 to prevent bending, warping or other deformation when bolts 132 and 134 are tightened securing cylinders 60 and 64 to end plate 56.

In use of the novel mounting structure of this invention it is obvious that it can be easily constructed to accomplish the end result in mounting shock absorbers of a cushioning unit for a railway car fifth wheel hitch as shown in FIG. 1. Although the mounting structure of this invention is shown with a cushioning unit that is mounted in the diagonal leg of a fifth wheel hitch, it is to be understood that it can be used in a cushioning unit that is mounted on the deck of a railway car and operably connected with the fifth wheel hitch. Because of the simplicity of this mounting structure, it can be constructed and installed with far less effort, fewer parts, and at a lower cost than the described prior art mounting structures. This novel mounting structure provides a simple, safe and secure means of mounting the cylinders of the shock absorbers with end plates for use in a cushioning unit. In use of the mounting structure of this invention it is seen that same provides a mount for one or both ends of a plurality of telescopic shock absorbers for securing the shock absorbers to end plates or the like wherein the end plates support the telescopic shock absorbers in a cushioning unit. It is to be understood that the mounting structure of this invention can be used for mounting either end or both ends of telescopic shock absorbers in a cushioning unit or otherwise mounting them with end plates or the like.

While the invention has been described in conjunction with preferred embodiments thereof, it will be understood that this description is intended to illustrate and not to limit the scope of the invention, which is defined by the following claims.

What is claimed is:

1. In a collapsible trailer hitch for releasably securing a trailer or the like to the deck of a railroad car for piggyback operation wherein the trailer hitch has a normally vertically disposed and movably mounted leg assembly, a movably mounted normally inclined leg assembly, and a cushioning unit operably connected to the inclined leg assembly, said cushioning unit having a plurality of energy-absorbing telescopic shock absorbers with one end portion of said plurality of shock absorbers being mountable on a connecting end plate, an improvement comprising means to mount said shock absorbers on said end plate which includes:
   a. an indention in a side portion of each of said shock absorbers, said indentions being substantially spaced from one end of said shock absorbers, and
   b. means to rigidly secure said shock absorbers to said end plate having a bar member being engageable in and extending between said indentions and said bar member being operably connectable to said end plate.

2. The means to mount of claim 1, wherein said means to mount includes a means to position said shock absorbers on said end plate.

3. The means to mount of claim 2, wherein said means to position has a plurality of cooperatively engageable members with one of said members being on an end portion of each of said shock absorbers and the other of said members being on said end plate.

4. The means to mount of claim 3, wherein:
   a. said cushioning unit has a pair of said shock absorbers mounted in juxtapositional relation on said end plate,
   b. said indentations are substantially equally spaced from said ends of said shock absorbers, and ;
   c. said means to rigidly secure has a bar member engageable in said indentations and a fastener to secure said bar to said end plate.

5. The means to mount of claim 4, wherein said means to position has a male member on said end portion of each of said shock absorbers and a plurality of female members positioned in a spaced relation on said end plate.

6. The means to mount of claim 5, wherein:
   a. said indentations are notches,
   b. said bar member has tapered opposite side portions engaged in said notches and an aperture through a mid portion thereof, c. said means to rigidly secure has a stiffener member on said bar member on the side of said bar member opposite to said end plate, said stiffener having an aperture through a mid portion thereof, said last named aperture aligning with said aperture in said bar member, d. said means to rigidly secure has a fastener engaged through said apertures and threadedly mounted in said end plate, e. said male members are lugs generally aligned with the telescopic axis of said shock absorbers, and f. said female members are indentations in said end plate.

7. The means to mount of claim 6, wherein said cushioning unit is mounted in said normally inclined leg assembly.

8. The means to mount of claim 3, wherein:

a. said shock absorbers have an outer cylinder on one end portion and an inner cylinder on the opposite end thereof, b. each said outer cylinder has an end member mounted inside the end portion thereof opposite to said inner cylinder, said end member having one of said cooperatively engageable members, and c. said outer cylinders having said indentations positioned in a facing relation.

9. The means to mount of claim 8, wherein:

a. said indentations are substantially equally spaced from said one end of said shock absorbers, and b. said means to rigidly secure has a bar member having opposed side portions engaged in said indentations and a fastener to rigidly secure said bar member to said end plate.

10. In a collapsible trailer hitch for releasably securing a trailer or the like to the deck of a railroad car for piggyback operation wherein the trailer hitch has a normally vertically disposed and pivotally mounted leg assembly, a pivotally mounted normally inclined leg assembly, and a cushioning unit operably mounted in a yoke assembly in the inclined leg assembly, said cushioning unit having a pair of energy-absorbing telescopic shock absorbers mounted in juxtapositional relation in said yoke assembly with one end portion of said plurality of shock absorbers being mountable on a connecting end plate in said yoke assembly, an improvement comprising means to mount said shock absorbers on said end plate which includes:

a. said shock absorbers having an indention in a side portion of each of said shock absorbers at one end portion thereof, b. a member engaging said indention of each of said shock absorbers, and c. means to rigidly secure said member to said end plate.

11. The means to mount of claim 10, wherein said means to mount further includes a means to position said shock absorbers on said end plate.

12. The means to mount of claim 11, wherein:

said member between said shock absorbers being a bar member operably engageable in and extending between said shock absorbers.

13. The means to mount of claim 12, wherein said means to position has a plurality of cooperatively engageable members with one of said members being on an end portion of each of said shock absorbers and the other being on said end plate.

* * * * *